United States Patent
Yasuda et al.

(10) Patent No.: US 11,377,555 B2
(45) Date of Patent: Jul. 5, 2022

(54) TRANSPARENT POLYAMIDE-BASED COMPOSITION COMPRISING A GLASS FILLER WITH LOW SILICA CONTENT

(71) Applicant: Arkema France, Colombes (FR)

(72) Inventors: Maho Yasuda, Kyoto (JP); Benoît Brule, Beaumont-le-Roger (FR); Benjamin Saillard, Bernay (FR); Marie Pommier De Santi, Shanghai (CN)

(73) Assignee: ARKEMA FRANCE, Colombes (FR)

( * ) Notice: Subject to any disclaimer, the term of this patent is extended or adjusted under 35 U.S.C. 154(b) by 71 days.

(21) Appl. No.: 16/651,598

(22) PCT Filed: Sep. 26, 2018

(86) PCT No.: PCT/EP2018/076121
§ 371 (c)(1),
(2) Date: Mar. 27, 2020

(87) PCT Pub. No.: WO2019/063608
PCT Pub. Date: Apr. 4, 2019

(65) Prior Publication Data
US 2020/0255661 A1 Aug. 13, 2020

(30) Foreign Application Priority Data
Sep. 27, 2017 (EP) .................................... 17306285

(51) Int. Cl.
*C08L 77/06* (2006.01)
(52) U.S. Cl.
CPC ......... *C08L 77/06* (2013.01); *C08L 2205/025* (2013.01)
(58) Field of Classification Search
None
See application file for complete search history.

(56) References Cited

U.S. PATENT DOCUMENTS

| 2010/0076155 A1 | 3/2010 | Higashiyama et al. |
| 2016/0369098 A1* | 12/2016 | Yasuda .................. C08G 69/40 |

FOREIGN PATENT DOCUMENTS

| EP | 2169008 A1 | 3/2010 |
| EP | 1086930 B1 | 12/2010 |
| WO | 2009153534 A1 | 12/2009 |
| WO | 2015132510 A1 | 9/2015 |

OTHER PUBLICATIONS

International Search Report (PCT/ISA/210) dated Dec. 11, 2018, by the European Patent Office as the International Searching Authority for International Application No. PCT/EP2018/076121.
Written Opinion (PCT/ISA/237) dated Dec. 11, 2018, by the European Patent Office as the International Searching Authority for International Application No. PCT/EP2018/076121.

* cited by examiner

*Primary Examiner* — Ana L. Woodward
(74) *Attorney, Agent, or Firm* — Buchanan Ingersoll & Rooney P.C.

(57) ABSTRACT

The present invention relates to transparent polyamide-based composition, comprising:
- from 5.0 to 40.0% by weight of semi-crystalline polyamide,
- from 20.0 to 80.0% by weight of at least one amorphous, transparent and at least partially cycloaliphatic polyamide,
- from 0.0 to 5.0% by weight of PEBA,
- from 0.0 to 5.0% by weight of additives, and
- from 5.0 to 50.0%, preferably from 10.0 to 40.0% by weight, preferably from 20.0 to 30.0% by weight by weight of glass filler,
where the glass filler, expressed as % by weight with respect to the total weight of filler, less than 60 wt. % silica ($SiO_2$) and more than 5 wt. % of boron oxide ($B_2O_3$).

The invention also relates to the manufacture of said composition, its use for the manufacture of transparent articles, said transparent articles and their process of manufacture.

15 Claims, No Drawings

TRANSPARENT POLYAMIDE-BASED COMPOSITION COMPRISING A GLASS FILLER WITH LOW SILICA CONTENT

TECHNICAL FIELD

The invention relates to novel transparent thermoplastic polymer compositions useful for the manufacture of articles that exhibit excellent properties of transparency, in particular a high transmittance in combination with a low haze.

Such compositions are useful for the manufacture of transparent articles used in automobiles, lighting or optical devices, electrical, electronic and telecommunication appliances and in particular mobile devices such as mobile phones.

Technological Background

Transparent materials formed from amorphous polyamides (PA) are used for the manufacture of transparent optical devices. They have the advantage of being lightweight but their stiffness has to be improved by the addition of a reinforcing material, such as reinforcing fibers, in particular glass fibers, inorganic fillers or rubber components.

The patent document EP 2 169 008 describes an amorphous polyamide resin composition comprising a glass filler whose refractive index does not differ from the one of the polyamide by more than 0.002. This composition makes it possible to obtain a molded article (sheet with a thickness of 2 mm) exhibiting a transmittance of approximately 65% and haze of approximately 25%. Such performance is however still insufficient for some applications. In addition, the high glass transition temperature (Tg) of these reinforced amorphous polyamides, greater than 150° C., can render their processing (in particular the injection molding) more difficult, and may notably induce material shrinkage.

Document WO 2015/132510 discloses polyamide-based compositions with an excellent transparency that comprise a semi-crystalline polyamide, an amorphous polyamide and glass fillers. The glass fillers mentioned are as S2 glass and glass containing, by weight relative to the total weight, 68-74% silica, 2-5% aluminium oxide, 2-5% boron oxide, 2-10% calcium oxide, 0-5% zinc oxide, 0-5% strontium oxide, 0-1% barium oxide, 1-5% magnesium oxide, 0-5% lithium oxide, 5-12% sodium oxide and 0-10% potassium oxide, the total amount of lithium oxide, sodium oxide and potassium oxide being 8-12%.

There is however still a need for rigid materials with an improved transparency, notably a high transmittance and a low haze.

There is further a need for such materials which are easy to process, and notably possess a good flowability, even with a high filler content of 20 wt. % or more.

SUMMARY OF THE INVENTION

The aim of the present invention is thus to provide a glass-filled transparent thermoplastic composition with improved transparency, notably improved transmittance and/or haze.

Another aim of the present invention is to provide such a composition that exhibits an improved flowability, and thus allows a high filler content.

Such aim is attained by transparent compositions based on semi-crystalline and amorphous polyamides that include fillers made of glass that comprises, expressed as % by weight with respect to the total weight of filler, less than 60.0 wt. % silica ($SiO_2$) and more than 5.0 wt. % of boron oxide ($B_2O_3$).

Indeed, it was surprisingly discovered that glass fillers as defined above can be used to prepare rigid polyamide-based compositions that have excellent transparency, as evidenced by a high transmittance and a very low haze.

Accordingly, a first aspect of the present invention is directed to a transparent polyamide-based composition, comprising:
- from 5.0 to 40.0% by weight of semi-crystalline polyamide,
- from 20.0 to 80.0% by weight of at least one amorphous, transparent and at least partially cycloaliphatic polyamide,
- from 0.0 to 5.0% by weight of PEBA,
- from 0.0 to 5.0% by weight of additives, and
- from 5.0 to 50.0%, preferably from 10.0 to 40.0% by weight, preferably from 20.0 to 30.0% by weight of glass filler, where the glass filler comprises, expressed as % by weight with respect to the total weight of filler, less than 60.0 wt. % silica ($SiO_2$) and more than 5.0 wt. % boron oxide ($B_2O_3$).

Particularly preferred is such a composition wherein the glass filler comprises, expressed as % by weight with respect to the total weight of filler, 52.0 to 57.0% of silica ($SiO_2$), 13.0 to 17.0% of aluminum oxide ($Al_2O_3$), 15.0 to 21.5% of boron oxide ($B_2O_3$), 2.0 to 6.0% of calcium oxide (CaO), 2.0 to 6.0% of magnesium oxide (MgO), 0.0 to 0.6% of lithium oxide ($Li_2O$), sodium oxide ($Na_2O$) and potassium oxide ($K_2O$) and 1.0 to 4.0% of titanium dioxide ($TiO_2$) and 0.2 to 2.0% of fluorine ($F_2$).

Preferably, the semi-crystalline polyamide is selected from the group consisting of PA 4.10, PA 4.T, PA 6, PA 6.6, PA 4.6, PA 6.10, PA 6.12, PA 11, PA 12, PA 9.10, PA 9.12, PA 9.13, PA 9.14, PA 9.15, PA 9.16, PA 9.18, PA 9.36, PA 10.10, PA 10.12, PA 10.13, PA 10.14, PA 12.10, PA 12.12, PA 12.13, PA 12.14, PA 6.14, PA 6.13, PA 6.15, PA 6.16, PA 6.18, PA MXD.6, PA MXD.10, PA 12.T, PA 11/10.T, PA 11/6.T, PA 10.T, PA 9.T, PA 18.T, PA 6.T/6.6, PA 6.6/6.T/6.I, PA 6/6.T and mixtures thereof.

Advantageously, the amorphous polyamide is selected from the group consisting of PA MACM.12, PA PACM.12, PA MACM.12/PACM.12, PA 11/MACM.14, PA 11/MACM.10, PA 12/MACM.I, PA 12/MACM.T, 12/MACM.I/MACM.T, PA 6.I/6.T, PA 6.I/6.T/MACM.I, PA 6.I/MACM.I/PACM.I/12, PA 6.I/6.T/MACM.I/MACM.T/PACM.I/PACM.T/12, PA 11/MACM.I, 11/MACM.T and mixtures thereof.

Preferably, the difference in the refractive indices of the glass filler and the resin components is 0.006 or less with respect to light of a wavelength of 589 nm.

Advantageously, the composition, when molded into a plate having a thickness of 1 mm, has a transmittance at 560 nm of at least 85% as measured according to Standard ISO 13468-2:2006.

Preferably, the composition, when molded into a plate having a thickness of 1 mm, has a haze of less than 15% as measured according to Standard ASTM D1003-97(A). The glass filler may in particular be selected from the group consisting of glass fibers, glass powder, glass flakes, milled fibers, glass beads and mixtures thereof. Glass fibers are particularly preferred, and among those, flat fibers are especially preferred.

The composition according to the invention may be in particular in form of pellets or powder.

According to a second aspect, the invention concerns a process for the manufacture of the transparent composition as defined above, comprising the step of:

mixing the semi-crystalline polyamide, the amorphous polyamide, the glass filler and the optional components in the appropriate amounts.

According to third aspect, the invention concerns a use of the transparent composition as defined above, for the manufacture of transparent articles, notably by molding, injection molding, extrusion, coextrusion, hot pressing, multi-injection molding, rotational molding or sintering, notably laser sintering.

According to third aspect, the invention concerns a process for the manufacture of a transparent article comprising the steps of:

mixing said semi-crystalline polyamide with said amorphous polyamide and said glass filler and optional components to obtain a transparent composition as defined above;

processing the transparent composition; and recovering the transparent article.

According to a last aspect, the invention also concerns a transparent article made of the composition as defined above. Such article may be in particular included in electric or electronic equipment, notably mobile devices, such as mobile phones and laptops; optical equipment, sports equipment; precision instruments; space equipment, in particular satellite or space shuttle equipment; aeronautical or motor vehicle equipment; displays; screens; thermal, solar or photovoltaic panels; construction articles; decorative articles; games; toys; fashion articles; furniture; packaging or luggage.

Definitions

Within the present specification:

The term "transparent" should be understood as meaning materials exhibiting:

a transmittance at 560 nm at least equal to 80%, in particular 85%, and most preferably more than 90% at 560 nm on a plate with a thickness of 1 mm (measured according to Standard ISO 13468-2:2006), a haze of less than 20%, in particular less than 15% and most preferably less than 10% (haze unit) on a 1 mm thick plate (measured according to Standard ASTM D1003-97(A)).

The term "haze" should be understood as meaning a tarnishing, a fogging, mist, or condensation at the surface of the material. Haze can adversely affect the transparency, the aesthetic appearance and the surface gloss of the composition.

The term "semi-crystalline polyamides" means polyamides that have a fusion enthalpy of at least 30 J/g. The fusion enthalpy of polyamides may be measured using differential scanning calorimetry (DSC) upon the second heating of the sample and according to ISO 11357-3:2013.

The term "amorphous polyamides" means polyamides which have a fusion enthalpy of less than 30 J/g. The fusion enthalpy of polyamides may be measured using DSC upon the second heating of the sample and according to ISO 11357-3:2013.

The term "glass filler" is understood to mean any glass filler, in particular as described by Frederick T. Wallenberger, James C. Watson and Hong Li, PPG industries Inc. (ASM Handbook, Vol. 21: composites (#06781G), 2001 ASM International). Preferred glass fillers have a refractive index which essentially matches the refractive index of the amorphous polyamide.

The term "NE glass" refers to a type of glass used notably for manufacturing glass fibers with a low dielectric constant and a dielectric dissipation factor. As defined in patent EP 1 086 930 B1 to Nitto Boseki Co. Ltd., such glass has the following composition: 53-57% by weight of silica ($SiO_2$), 13-16% by weight of aluminum oxide ($Al_2O_3$), 15.0-19.5% by weight of boron oxide ($B_2O_3$), 3.0-less than 6% by weight of magnesium oxide (MgO), 2-5% by weight of calcium oxide (CaO) and 1-4% by weight of titanium dioxide ($TiO_2$), 0-0.2% by weight of lithium oxide ($Li_2O$), 0-0.2% by weight of sodium oxide ($Na_2O$), 0-0.2% by weight of potassium oxide ($K_2O$) and 0.2-1 wt. % of fluorine ($F_2$), the content of MgO and CaO being 7-10% and the content of $Li_2O$, $Na_2O$ and $K_2O$ being 0.2-0.5%.

The term "monomer" in the present description of the polyamides has to be taken within the meaning of "repeat unit". Indeed, in case the repeat unit of a polyamide is composed of a combination of a diacid with a diamine, the monomer is represented by the combination of said diamine and diacid, that is to say the diamine.diacid pair (in equimolar amounts). Indeed, individually, the diacid or the diamine is only a structural unit, and not capable in itself to polymerize.

DETAILED DESCRIPTION

In its broadest definition, the present invention is directed to a transparent composition comprising:

a semi-crystalline polyamide;

an amorphous polyamide; and a glass filler, expressed as % by weight with respect to the total weight of filler, less than 60.0 wt. % silica (Sift) and more than 5.0 wt. % of boron oxide ($B_2O_3$).

While such glass fillers are known as such, it was rather unexpected to find that, when included in transparent polyamide-based compositions, these glass fillers show improved transmittance and haze values compared to similar resin compositions reinforced with conventional glass fillers such as S2 glass.

According to a first aspect, the invention is thus directed to a transparent composition that comprises, with respect to the total weight of the composition:

from 5.0 to 40.0% by weight, preferably from 10.0 to 30.0% by weight, preferably from 10.0 to 20.0% by weight of semi-crystalline polyamide, from 20.0 to 80.0% by weight, preferably from 30.0 to 70.0% by weight, preferably from 40.0 to 60.0% by weight of at least one amorphous, transparent and at least partially cycloaliphatic polyamide, from 5.0 to 50.0%, preferably from 10.0 to 40.0% by weight, preferably from 20.0 to 30.0% by weight by weight of glass filler, where the glass filler comprises, expressed as % by weight with respect to the total weight of filler, less than 60.0 wt. % silica ($SiO_2$) and 5.0 wt. % or more of boron oxide ($B_2O_3$).

Semi-Crystalline Polyamide

The semi-crystalline polyamide present in the transparent composition of the invention may be a homopolyamide or copolyamide. The semi-crystalline polyamide may be an aliphatic polyamide, semi-aromatic polyamide or a mixture thereof.

Linear aliphatic polyamides are particularly preferred. Because of the presence of large spherolites, the transmittance of such polyamides is generally less than 80%, at 560 nm for a plate with a thickness of 1 mm (according to Standard ISO 13468-2:2006).

In particular, the semi-crystalline polyamide used in the present invention may be selected from the group consisting of: PA 4.10, PA 4.T, PA 6, PA 6.6, PA 4.6, PA 6.10, PA 6.12, PA 11, PA 12, PA 9.10, PA 9.12, PA 9.13, PA 9.14, PA 9.15, PA 9.16, PA 9.18, PA 9.36, PA 10.10, PA 10.12, PA 10.13, PA 10.14, PA 12.10, PA 12.12, PA 12.13, PA 12.14, PA 6.14, PA 6.13, PA 6.15, PA 6.16, PA 6.18, PA MXD.6, PA MXD.10, PA 12.T, PA 10.T, PA 9.T, PA 18.T, PA 6.T/6.6, PA 6.6/6.T/61, PA 6/6.T, PA 11/10.T, PA 11/6.T random and/or block copolymers and mixtures thereof.

Particularly preferred semi-crystalline polyamides are PA 11, PA 12, PA 10.10, random and/or block copolymers and mixtures thereof.

The composition according to the invention may comprise one, two or more distinct semi-crystalline polyamides. Preferred are compositions comprising one or two distinct semi-crystalline polyamides.

The semi-crystalline polyamide represents from 5% to 40% by weight, preferably from 10% to 30% by weight, preferably from 10% to 20% by weight, with regard to the total weight of the transparent composition according to the invention.

Amorphous Polyamide

The amorphous polyamides present in the transparent composition of the invention may be homopolyamides or copolyamides. They are preferably chosen from aliphatic polyamides, cycloaliphatic polyamides, aromatic polyamides and mixtures thereof.

Amorphous polyamides are generally rigid (flexural modulus ISO>1300 MPa) and do not distort under heat, at 60° C., as they have a glass transition temperature Tg of greater than 75° C. However, their impact resistance, in terms of notched Charpy ISO impact is lower in comparison with impact-modified polyamides. Further, their chemical resistance is not excellent, in particular due to their amorphous nature.

Appropriate amorphous polyamides are described in documents EP 1 595 907 and WO 09/153534. Mention may be made, as examples of amorphous polyamides, of PA MACM.10, PA MACM.12, PA MACM.14, PA MACM.16, PA MACM.18, PA PACM.12, PA MACM.12/PACM.12, PA 11/MACM.14, PA 11/MACM.10, PA 12/MACM.I, PA 12/MACM.I/MACM.T, PA 6.I/6.T, PA 6.I/6.T/MACM.I, PA 11/MACM.I, random and/or block copolymers and mixtures thereof.

In one embodiment, the composition of the invention comprises a mixture of at least one aliphatic amorphous polyamide and at least one aromatic amorphous polyamide. Such a mixture comprises preferably 10 to 80% by weight of aliphatic amorphous polyamide and 20 to 90% by weight of aromatic amorphous polyamide.

In another embodiment, the amorphous polyamides are non-aromatic. Indeed, aromatic amorphous polyamides generally increase the Tg of the composition, and thus require a higher processing temperature, and thus present an increased risk of degradation of the other components of the composition.

According to a preferred embodiment of the present invention, the amorphous polyamide comprises more than 50 mol %, especially more than 70 mol %, even more preferably more than 80 mol %, and in particular more than 90 mol %, and in particular 100 mol % of an equimolar combination of at least one cycloaliphatic diamine and of at least one aliphatic dicarboxylic acid.

The at least one aliphatic dicarboxylic acid comprises preferably more than 50 mol % of a linear aliphatic dicarboxylic acid. Preferably, said linear aliphatic dicarboxylic acid has 10 to 36 carbon atoms, and in particular 10 to 18 carbon atoms. Aliphatic dicarboxylic acids may be preferably chosen from 1,10-decanedicarboxylic acid or sebacic acid, 1,12-dodecanedicarboxylic acid, 1,14-tetradecanedicarboxylic acid and 1,18-octadecanedicarboxylic acid and mixtures thereof. Such particular composition of the amorphous polyamide allows the achievement of a transmittance at 560 nm of at least 85%, and even 90% or more.

The at least one aliphatic dicarboxylic acid can however also optionally be at least partially branched by at least one $C_1$ to $C_3$ alkyl group (having from 1 to 3 carbon atoms).

The at least one aliphatic dicarboxylic acid can also be cycloaliphatic. Examples of such cycloaliphatic dicarboxylic acids include 1,4-cyclohexanedicarboxylic acid and 1,3-cyclohexanedicarboxylic acid.

Further, non-aliphatic dicarboxylic acid can contribute to the monomer composition of the amorphous polyamide. Non-aliphatic dicarboxylic acids may be preferably chosen from aromatic diacids, in particular isophthalic acid (I), terephthalic acid (T), naphtalenedicarboxylic acid and mixtures thereof. In one embodiment, non-aliphatic dicarboxylic acids are present in a proportion of at most 15 mol %, with respect to the total dicarboxylic acid monomers of the amorphous polyamide.

Appropriate cycloaliphatic diamines include bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis(3-methyl-4-aminocyclohexyl)methane (abbreviated to "BMACM" or "MACM" or "B"), bis(p-aminocyclohexyl)methane (abbreviated to "PACM" or "P"), 2,2-bis(3-methyl-4-aminocyclohexyl)propane (MACP), isophoronediamine (IPD), 2,6-bis(aminomethyl)norbornane (BAMN), 1,3-bis(aminomethyl)cyclohexane (BAC), and their mixtures.

Advantageously, a single cycloaliphatic diamine, in particular bis(3-methyl-4-aminocyclohexyl)methane (BMACM) or bis(p-aminocyclohexyl)methane (PACM), is used as a diamine for the preparation of the amorphous polyamide.

However, according to a particular embodiment, at least one non-cycloaliphatic diamine can also participate in the composition of the diamine monomers of the amorphous polyamides. Such non-cycloaliphatic diamines are preferably present in a proportion of at most 30 mol %, with respect to the diamine monomers of the amorphous polyamides. Mention may be made, as non-cycloaliphatic diamine, of linear aliphatic diamines, such as 1,4-tetramethylenediamine, 1,6-hexamethylenediamine, 1,9-nonanediamine and 1,10-decamethylenediamine. Non-cycloaliphatic diamines branched by at least one $C_1$ to $C_3$ alkyl group (having from 1 to 3 carbon atoms) may also be present. Appropriate non-cycloaliphatic branched diamines include trimethyl-1,6-hexamethylenediamine, and 2-methyl-1,5-pentamethylenediamine.

The amorphous polyamide can further optionally comprise up to 50 mol % of at least one polyamide comonomer different from the said predominant equimolar combination defined above. Said at least one different comonomer may be chosen from lactams, α,ω-aminocarboxylic acids, diamine.diacid combinations other than that defined above, and their mixtures. The lactam may, for example, be chosen from caprolactam, oenantholactam and lauryllactam. The α,ω-aminocarboxylic acid may be, for example, chosen from aminocaproic acid, 7-aminoheptanoic acid, 11-aminoundecanoic acid or 12-aminododecanoic acid. Preferably, the amorphous polyamide comprises less than 30 mol %, preferably less than 20 mol %, and in particular less than 10 mol % of said different polyamide comonomer(s).

Preferred examples of amorphous polyamides comprise in particular: the polyamide PA MACM.12, PA PACM.12, PA MACM.12/PACM.12, PA 11/MACM.14, PA 11/MACM.10, PA 12/MACM.I, PA 12/MACM.T, 12/MACM.I/MACM.T, PA 6.I/6.T, PA 6.I/6.T/MACM.I, PA 6.I/MACM.I/PACM.I/12, PA 6.I/6.T/MACM.I/MACM. T/PACM.I/PACM. T/12, PA 11/MACM.I, 11/MACM.T and mixtures thereof.

Use may also be made of the amorphous polyamides available on the market, such as Grilamid® TR55, Grilamid® TR90, manufactured by EMS Chemie, Trogamid® CX7323, manufactured by Evonik Degussa-Chemie, Rilsan® Clear G170 and Rilsan® Clear G850, manufactured by Arkema.

The refractive index of the resin composition is preferably from 1.505 to 1.545, even more preferably from 1.507 to 1.540, and in particular from 1.508 to 1.520, with respect to light having a wavelength of 589 nm.

Said amorphous polyamide represents 20% to 80% by weight, preferably 30% to 70% by weight, and in particular 40% to 60% by weight, with respect to the total weight of the composition according to the invention.

PEBA

The composition according to the invention can additionally comprise 0.0 to 5.0%, preferably 1.0 to 4.0% and in particular 2.0 to 3.0 by weight of at least one copolymer comprising PE block(s) and PA block(s), hereinafter designated by the term PEBA.

The PEBA result from the polycondensation of polyamide blocks comprising reactive ends with polyether blocks comprising reactive ends, such as, inter alia:
1) polyamide blocks comprising diamine chain ends with polyoxyalkylene blocks comprising dicarboxyl chain ends,
2) polyamide blocks comprising dicarboxyl chain ends with polyoxyalkylene blocks comprising diamine chain ends, which are obtained by cyanoethylation and hydrogenation of aliphatic α,ω-dihydroxylated polyoxyalkylene blocks, known as polyetherdiols,
3) polyamide blocks comprising dicarboxyl chain ends with polyetherdiols, the products obtained being, in this specific case, polyetheresteramides.

The polyamide blocks comprising dicarboxyl chain ends originate, for example, from the condensation of precursors of polyamides in the presence of a chain-limiting dicarboxylic acid. The polyamide blocks comprising diamine chain ends originate, for example, from the condensation of precursors of polyamides in the presence of a chain-limiting diamine.

The number-average molar mass Mn of the polyamide blocks is between 400 and 20 000 g/mol, preferably between 500 and 10 000 g/mol.

Said polyether blocks represent from 10 to 80% by weight, preferably from 20 to 60% by weight, preferably from 20 to 40% by weight, with respect to the total weight of the copolymer.

The number-average molecular weight of the polyether blocks is between 200 and 1000 g/mol (limits excluded), preferably within the range from 400 to 800 g/mol (limits included), preferably from 500 to 700 g/mol.

The polyether blocks result, for example, from at least one polyalkylene ether polyol, in particular a polyalkylene ether diol, preferably chosen from polyethylene glycol (PEG), polypropylene glycol (PPG), polytrimethylene glycol (PO3G), polytetramethylene glycol (PTMG) and their mixtures or their copolymers. The PE blocks can comprise polyoxyalkylene sequences comprising $NH_2$ chain ends, it being possible for such sequences to be obtained by cyanoacetylation of aliphatic α,ω-dihydroxylated polyoxyalkylene sequences, known as polyetherdiols. More particularly, use may be made of Jeffamines (for example, Jeffamine® D400, D2000, ED 2003 or XTJ 542, commercial products from Huntsman).

Said at least one polyether block preferably comprises at least one polyether chosen from polyalkylene ether polyols, such as PEG, PPG, PO3G, PTMG, polyethers comprising polyoxyalkylene sequences comprising $NH_2$ chain ends, their random and/or block copolymers (copolyethers) and their mixtures.

It may be advantageous that the chemical composition of the amorphous polyamide matches the one of the polyamide blocks of the PEBA, so as to optimize the compatibility of the polyamide with the PEBA.

The addition of PEBA to the composition generally improves the processability of the composition: improved fluidity (or flow capability) and improved ductility, while retaining its transparency properties. The injection molding of the composition according to the invention is easy and results in very little shrinkage of material after injection molding, which makes it possible to obtain parts of high dimensional accuracy.

The semi-crystalline polyamide, the amorphous polyamide and the optional PEBA used in the composition of the invention preferably have substantially the same refractive index. In order to adjust the refractive index, it is possible to vary the starting materials used to synthesize the PEBA and the polyamides. Generally, the addition of an aromatic compound (for example an aromatic diacid) increases the refractive index of a product. For the PEBAs, the refractive index decreases if, for example, the PTMG content is increased, in comparison with the pure polyamide having the same composition as the polyamide block of the PEBA. In the series of the polyamides of the BMACM.Y type, Y being an aliphatic diacid, the longer Y is, the lower is the refractive index. For a linear aliphatic polyamide, the higher the $CH_2$ number in the unit is, the lower is the refractive index.

Glass Filler

According to the invention, the glass filler present in the transparent composition has a silica ($SiO_2$) content below 60.0 wt. %, and preferably of 52.0-57.0 wt. % and a boron oxide content of more than 5.0 wt. %, in particular of 15.0-21.5 wt. %.

Preferably, the glass filler has an alumina ($Al_2O_3$) content of 8.0 to 22.0 wt. %, in particular 10.0 to 20.0 wt. % and more specifically between 13.0 and 17.0 wt. %. The glass filler may preferably further have an magnesium oxide (MgO) content of 0.0 to 10.0 wt. %, in particular 1.0 to 8.0 wt. % and more specifically between 2.0 and 6.0 wt. %. Advantageously, the glass filler has an calcium oxide (CaO) content of 0.0 to 10.0 wt. %, in particular 1.0 to 8.0 wt. % and more specifically between 2.0 and 6.0 wt. %. Preferably, the glass filler further has an titanium dioxide ($TiO_2$) content of 0.0 to 10.0 wt. %, in particular 0.5 to 5.0 wt. % and more specifically between 1.0 and 4.0 wt. %.

Preferably, the glass filler is further characterized in that it has a fluorine ($F_2$) content of 0.0 to 5.0 wt. %, in particular 0.5 to 3.0 wt. % and more specifically 0.2 to 2.0 wt. %. Further, the glass filler preferably has a combined content of lithium, sodium and potassium oxide ($Li_2O+Na_2O+K_2O$) of 0.0 to 3.0 wt. %, in particular 0.0 to 1.0 wt. % and more specifically less than 0.6 wt. %.

According to a particularly preferred embodiment, the glass filler essentially comprises (and may even consists of) the above mentioned minerals. The glass filler can however also comprise further one or more component(s) other than the components mentioned above, such as, for example, an oxide of a metal such as Ba, Zn, Sr, Fe, Co, Ni, Sn, Zr or Mo.

The refractive index of the glass filler advantageously essentially matches the refractive index of the resin composition described above. Preferably, the glass filler described above has a refractive index of 1.505 to 1.545, and in particular from 1.507 to 1.540 with respect to light having a wavelength of 589 nm.

The refractive index of the glass filler can be appropriately adjusted to the refractive index of the resin composition.

In the case where the refractive index of the glass filler is lower than the desired refractive index, the refractive index can be increased, for example, by replacing a portion of the silica ($SiO_2$) with calcium oxide (CaO). For example, if 0.4% of silica ($SiO_2$) is substituted by 0.4% of calcium oxide (CaO), the refractive index of the glass filler increases by approximately 0.002.

In the case where the refractive index of the glass filler is higher than the desired refractive index, the refractive index can be lowered, for example, by replacing a portion of the calcium oxide (CaO) with an alkali metal compound. Specifically, for example, if 0.5% of calcium oxide (CaO) is substituted by 0.5% of sodium oxide ($Na_2O$), the refractive index of the glass filler decreases by approximately 0.002.

In one embodiment, the difference in refractive indices between the glass filler and the resin composition is 0.010 or less, preferably 0.006 or less, in particular 0.002 and most preferably 0.001 or less with respect to light having a wavelength of 589 nm.

The refractive index is measured at 23° C., at a given wavelength, on an Abbe refractometer from Atago (Model NAR_1T SOLID).

In the present invention, the glass filler can comprise (indeed even be comprised of): glass fibers, glass powders, glass flakes, milled fibers, glass beads and mixtures thereof.

Glass powder can be produced by any production process, such as melting of glass, followed by granulation in water. The average size of the particles is preferably from 1 to 100 μm as determined using a laser diffraction particle size analyser according to ISO 13320-1:2009.

The glass filler can also be in the form of glass flakes, which can be produced by any conventional production process, in particular by spraying the molten mass. The thickness of the glass flakes is preferably from 0.1 to 10 μm.

Milled fibers can be produced by known conventional processes. For example, a milled fiber can be produced by pulverizing a strand of a glass fiber using a hammer mill or a bead mill. The diameter of the fiber and the length to diameter ratio of the milled fiber are preferably from 5 to 50 μm and from 2 to 150, respectively.

Glass beads can be produced by any production process conventionally known, for example by melting and spraying the molten glass mass. The size of the particles of the glass beads is preferably from 5 to 300 μm.

Among the glass fillers mentioned above, glass fibers are preferred because of their mechanical strength. The diameter of the glass fibers is preferably from 5 to 50 μm, preferably from 10 to 45 μm. The glass fibers further have a preferred average length of 100 μm to 10 mm, in particular 1 to 6 mm.

The glass fibers may have a circular or a non-circular cross sectional area. Fibers with a non-circular cross sectional area, also called flat fibers, are preferred.

Indeed, it was observed that flat fibers allow an improved flowability. Compositions with a high flowability are easier to manufacture and to transform. Accordingly, it is possible to add a higher proportion of flat glass fibers compared to other glass fillers, notably glass fibers with circular cross sectional area. Compositions with a higher filler content generally exhibit a higher strength. Flat glass fibers further confer a smooth surface and thus lead to compositions with high gloss.

Flat fibers may be described by two diameters a and b. Preferably, the smaller diameter a of the flat fibers is from 3 to 15, and more preferred from 5 to 10 μm. The greater diameter b of the flat fibers is preferably from 5 to 25, and more preferred from 10 to 15 μm.

Glass fibers can be produced by any spinning process conventionally known for a continuous glass fiber. For example, it is possible to fibrillate the glass by different processes, such as the direct melting process, in which the glass is subjected to continuous vitrification in a furnace, then introduced into a crucible and subjected to spinning by a bushing fitted to the lower part of the crucible, and the remelting process, in which melted glass is transformed into a bead or a rod, followed by remelting and spinning.

Particularly preferred glass fillers are flat NE glass fibers sold by NITTO BOSEKI.

Advantageously, the glass filler is surface-treated with a coupling agent in order to increase the affinity and the adhesion to the resin composition. A good affinity between the glass filler and the resin composition prevents any decrease in the transparency of the molded product caused by the formation of voids.

Mention may be made, as coupling agents, of those based on silane, on borane, on aluminates, those of titanate type, and the like. In particular, silane coupling agents are preferred as they make possible good adhesion between the amorphous polyamide resin and the glass filler. Use may be made, as coupling agent of silane type, of aminosilane, epoxysilane and acrylsilane coupling agents and the like. Among silane coupling agents, aminosilane coupling agents are preferred.

In addition, the treatment of the fillers can optionally comprise film-forming agents, lubricating agents, antistatic agents and the like, in addition to the coupling agent. These components can be used alone or in combination. Mention may be made, as examples of film-forming agent, of vinyl acetate, urethane, acrylic, polyester, polyether, phenoxy, polyamide and epoxy resins and/or the like. Mention may be made, as examples of lubricating agent, of aliphatic ester, aliphatic ether, aromatic ester or aromatic ether surface-active agents. Mention may be made, as examples of antistatic agent, of inorganic salts, such as lithium chloride or potassium iodide, and also quaternary ammonium salts, such as ammonium chloride or ammonium ethosulphate.

According to the present invention, the content of glass filler in the polyamide composition is from 5.0 to 50.0% by weight, in particular from 10.0 to 40.0%, preferably from 20.0 to 30.0% by weight, with respect to the total weight of the composition.

When the amount of the glass filler in the polyamide composition is within the abovementioned range, it is possible to produce a molded product that combines good mechanical properties and an excellent transparency.

The semi-crystalline polyamide, the amorphous polyamide and the optional other polymers in the composition of the invention preferably have substantially the same refractive index. In order to adjust the refractive index, it is possible to vary the starting materials used to synthesize the respective polymers. Generally, the addition of an aromatic compound (for example an aromatic diacid) increases the refractive index of a product. In the series of the polyamides of the MACM.Y type, Y being an aliphatic diacid, the longer Y is, the lower is the refractive index. For a linear aliphatic polyamide, the higher the $CH_2$ number in the unit is, the lower is the refractive index.

Additives

Advantageously, the compositions defined above may further comprise from 0.0 to 5.0% by weight, and preferably from 0.5 to 4% and preferably from 1 to 3% by weight of additives.

The additive may be any conventional additive used in the field of polymers. In particular, it may be selected in the group consisting in colouring agents, in particular pigments and dyes; UV stabilizers; anti-ageing agents; antioxidants; fluidizing agents; anti-abrasion agents; mold-release agents; stabilizers; plasticizers; impact modifiers; surfactants; brighteners; fillers; fibers which are not glass fibers; waxes; and mixtures thereof.

Pigments may be in particular effect pigments, such as diffractive pigments, interference pigments, such as pearlescent agents, reflective pigments and mixtures thereof.

Fillers other than the glass fillers described above include notably silica, carbon black, carbon nanotubes, expanded graphite and titanium oxide.

Processes of Manufacture and Use

The transparent polyamide-based composition of the invention may be manufactured easily using the processes known in the art.

According to a second aspect, the invention is thus directed to a process for the manufacture of the composition of the invention, comprising the step of:

mixing the semi-crystalline polyamide, the amorphous polyamide, the glass filler and the optional components in the appropriate amounts.

As a rule, the order of introduction of the components is not critical. Accordingly, the ingredients may be added in any order.

The mixing step can be carried out by dry blending the components. In the alternative, the mixing may be carried out by compounding the various components. Dry blending is preferred as it is more convenient and further entails less risk of contamination.

The composition according to the invention can then be further processed, notably transformed into pellets or powders.

Pellets can be produced notably by extrusion.

The pellets may subsequently be reduced into a powder. The average diameter, as determined using a laser diffraction particle size analyzer, of the powder is preferably within the range from 1 to 1000 µm, preferably 50 to 800, even more preferred 100 to 600 and in particular 200 to 400 µm. Such powders may be produced by conventional techniques such as cryogenic grinding and microgranulation.

The composition of the invention in form of pellets or powder can be used in conventional processes for shaping polymers to produce filaments, pipes, films or sheets, plates, or other transparent articles. The excellent match of the refractive indices of the resin composition and the glass filler makes it possible to obtain an article having a very high transparency.

According to a third aspect, the invention is thus also directed to the use of the composition described above for the manufacture of transparent articles.

The transparent articles may be manufactured in particular by molding, injection molding, extrusion, coextrusion, hot pressing, multi-injection molding, rotational molding or sintering, notably laser sintering.

According to a fourth aspect, the invention is directed to a process for the manufacture of a transparent article comprising the steps of:

mixing said semi-crystalline polyamide with said amorphous polyamide and said glass filler and optional components to obtain the transparent composition of the invention;

processing the transparent composition; and recovering the transparent article.

The processing step may be carried out using conventional processes for shaping polymers, such as molding, injection molding, extrusion, coextrusion, hot pressing, multi-injection molding, rotational molding, sintering, notably laser sintering.

For the manufacture of articles by molding, injection-molding or extrusion, it is preferred to use the composition of the invention in form of pellets.

For the manufacture of articles by sintering, such as laser sintering or by rotational molding, it is preferred to use the composition of the invention in powder form. Such powder has preferably an average particle size of less than 400 µm, and even more preferably less than 200 µm.

According to a fifth aspect, the invention is directed to an article made of the transparent composition of the invention.

Such articles may show an improved transparence as characterized notably by a superior transmittance and a low haze and may therefore be of interest in electric or electronic equipment, notably mobile devices, such as mobile phones and laptops; optical equipment; sports equipment; precision instruments; space equipment, in particular satellite or space shuttle equipment; aeronautical or motor vehicle equipment; displays; screens; thermal, solar or photovoltaic panels; construction articles; decorative articles; games; toys; fashion articles; furniture; packaging or luggage, preferably electric and electronic equipment such as mobile devices.

More specifically, the article may be a glass, a frame, a lens, a sheet, a glazing, a visor, a shield, a window, an aircraft canopy, a protective shell or a packaging.

Even more specifically, the article may be a glass, a frame and/or a lens, a ballistic glazing, a transparent sheet, a helmet, a visor, a shield, a protective suit; sports equipment; a watch glass; space equipment, in particular satellite or space shuttle equipment; aeronautical or motor vehicle equipment, such as a windshield, glazing, a porthole, a cockpit, an aircraft canopy, a window, bulletproof glazing, in particular for a car or a structure, spotlight or headlight glazing; display glazing, in particular advertising, electronic or computer glazing; a screen component; glazing for a thermal, solar or photovoltaic panel; an article for the construction, furnishing, electrical appliance or decorative industry; for the games or toys industry; for the fashion industry, such as shoe heels or jewels; for the furniture industry, such as a table, seat or armchair component; a presentation, packaging, housing, box, container or flask article or component, an article for perfumery, for the cosmetics or pharmaceutical industry; luggage; a component for protection during transport; a protective shell of a computing, electronic or telecommunications device, in particular a mobile phone.

EXAMPLES

The examples below illustrate the present invention without limiting the scope thereof. Unless otherwise indicated, all the percentages and parts are expressed by weight.

All viscosities in solution are inherent viscosities, and have been measured in m-cresol according to standard ISO 307:2007.

The transparency properties (transmittance and haze) were measured on plates having a thickness of 1 mm. Haze was measured in accordance with Standard ASTM D1003-97(A). Transmittance was measured at 560 nm in accordance with Standard ISO 13468-2:2006.

The refractive index was measured for the resin composition with glass fibers at 23° C., at 589 nm, on an Abbe refractometer from Atago (Model NAR 1T SOLID).

Amorphous Polyamide Used:

PAam1: PA 11/MACM.10, comprising more than 80 mol % of MACM.10 monomer (in which "10" represents sebacic acid comprising 10 carbon atoms) and less than 20 mol % of 11-aminoundecanoic acid comonomer, the molar proportion of MACM.10 being >0% and the molar proportion of PA 11 being <100%. The solution viscosity is less than 1.10.

The amorphous polyamide was prepared according to the process described in application WO 2009/153534 from page 20, line 12, to page 21, line 9.

Semi-Crystalline Polyamide Used:

PAsc: PA 10.10 with a solution viscosity of 0.97 to 1.10.

Glass Fibers Used:

NE flat glass fibers (having an average diameter of 6.4×28.5 microns and an average length of 3.2 mm) sold by Nitto Boseki or round glass fibers (having an average diameter of 15 microns and an average length of 3 mm) sold by Asahi Fiberglass Ltd. (AFG).

The compositions of the different glass fibers are given in Table 1 below.

TABLE 1

| Glass fiber | AFG | Nitto Boseki |
|---|---|---|
| $SiO_2$ | 71 | 54.5 |
| $Al_2O_3$ | 4 | 14.6 |
| $B_2O_3$ | 4 | 19.4 |
| MgO | — | 4.2 |
| CaO | 7 | 4.1 |
| $Fe_2O_3$ | — | 0.1 |
| $Na_2O/K_2O$ | 11 | 0.2 |
| $Li_2O$ | — | — |
| $TiO_2$ | — | 1.9 |
| $F_2$ | — | 1.0 |
| Refractive index | 1.509 | 1.513 |

A dry blend of pellets of PAam, PAsc, glass fillers was injection molded to produce plates and test specimen. The composition of the tested compositions is shown in Table 2 below.

The following injection parameters were used:
Barrel temperature: 295° C.
Mold temperature: 80° C.
Injection speed: 60 mm/sec.

TABLE 2

| Example | 1 | Cp 1 | 2 | Cp 2 |
|---|---|---|---|---|
| PAsc | 25 | 25 | 20.5 | 20.5 |
| PAam1 | 45 | 45 | 64.5 | 64.5 |

TABLE 2-continued

| Example | 1 | Cp 1 | 2 | Cp 2 |
|---|---|---|---|---|
| GF AFG | — | 30 | — | 15 |
| GF NE | 30 | — | 15 | — |
| Total (%) | 100 | 100 | 100 | 100 |
| Transmittance | 87.7 | 87.8 | 89.6 | 89.1 |
| Haze | 6.7 | 13.7 | 4.1 | 7.2 |
| Refractive index of the PA composition | 1.511 | 1.511 | ND | ND |

The results show that compositions of Examples 1 and 2 according to the invention have a high transparency (transmittance greater than 85% at 560 nm and haze of less than 15% at 560 nm).

More specifically, the transmittance is comparable or better than for comparative examples Cp 1 and Cp 2 according to the prior art.

Further, Examples 1 and 2 show notably better haze values compared to comparative examples Cp 1 and Cp 2.

It follows from these examples that the combination of a resin composition comprising both an amorphous polyamide and a semi-crystalline polyamide with a glass filler made of glass having a silica content of below 60 wt % and a boron oxide content of 5 wt. % or more, such as NE glass, may provide highly transparent rigid compositions.

Such compositions are particularly interesting for the manufacture of highly transparent articles, notably for electric and electronic equipment such as mobile devices.

The invention claimed is:

1. A transparent polyamide-based composition, comprising, with respect to the total weight of the composition:
   from 5.0 to 40.0% by weight of semi-crystalline polyamide,
   from 20.0 to 80.0% by weight of at least one amorphous polyamide that is transparent and at least partially cycloaliphatic,
   from 0.0 to 5.0% by weight of PEBA,
   from 5.0 to 50.0% by weight of glass filler, and
   from 0.0 to 5.0% by weight of additives, said additives not comprising the semi-crystalline polyamide, the at least one amorphous polyamide, the glass filler and the optional PEBA,
   where the glass filler comprises, expressed as % by weight with respect to the total weight of filler, less than 60.0 wt. % silica ($SiO_2$) and from 15.0 to 21.5 wt. % boron oxide ($B_2O_3$).

2. The composition according to claim 1, wherein the glass filler comprises, expressed as % by weight with respect to the total weight of filler:
   52.0 to 57.0% of silica ($SiO_2$);
   13.0 to 17.0% of aluminum oxide ($Al_2O_3$);
   15.0 to 21.5% of boron oxide ($B_2O_3$);
   2.0 to 6.0% of calcium oxide (CaO);
   2.0 to 6.0% of magnesium oxide (MgO);
   0.0 to 0.6% of lithium oxide ($Li_2O$), sodium oxide ($Na_2O$) and potassium oxide ($K_2O$);
   1.0 to 4.0% of titanium dioxide ($TiO_2$); and
   0.2 to 2.0% fluorine ($F_2$).

3. The composition according to claim 1, wherein the semi-crystalline polyamide is selected from the group consisting of PA 4.10, PA 4.T, PA 6, PA 6.6, PA 4.6, PA 6.10, PA 6.12, PA 11, PA 12, PA 9.10, PA 9.12, PA 9.13, PA 9.14, PA 9.15, PA 9.16, PA 9.18, PA 9.36, PA 10.10, PA 10.12, PA 10.13, PA 10.14, PA 12.10, PA 12.12, PA 12.13, PA 12.14, PA 6.14, PA 6.13, PA 6.15, PA 6.16, PA 6.18, PA MXD.6, PA MXD.10, PA 12.T, PA 11/10.T, PA 11/6.T, PA 10.T, PA 9.T, PA 18.T, PA 6.T/6.6, PA 6.6/6.T/6.I, PA 6/6.T and mixtures thereof.

4. The composition according to claim 1, wherein the amorphous polyamide is selected from the group consisting of PA MACM.12, PA PACM.12, PA MACM.12/PACM.12, PA 11/MACM.14, PA 11/MACM.10, PA 12/MACM.I, PA 12/MACM.T, 12/MACM.I/MACM.T, PA 6.1/6.T, PA 6.1/6.T/MACM.I, PA 6.1/MACM.I/PACM.I/12, PA 6.I/6.T/MACM.I/MACM.T/PACM.I/PACM.T/12, PA 11/MACM.I, 11/MACM.T and mixtures thereof.

5. The composition according to claim 1, wherein the difference in the refractive indices of the glass filler and the resin components is 0.006 or less with respect to light of a wavelength of 589 nm.

6. The composition according to claim 1, wherein the composition, when molded into a plate having a thickness of 1 mm, has a transmittance at 560 nm of at least 85% as measured according to Standard ISO 13468-2:2006.

7. The composition according to claim 1, wherein the composition, when molded into a plate having a thickness of 1 mm, has a haze of less than 15% as measured according to Standard ASTM D1003-97(A).

8. The composition according to claim 1, wherein the glass filler is selected from the group consisting of glass fibers, glass powder, glass flakes, milled fibers, glass beads and mixtures thereof.

9. The composition according to claim 8, wherein the glass filler is glass fibers.

10. The composition according to claim 9, wherein the glass fibers are flat fibers.

11. The composition as defined in claim 1 in form of pellets or powder.

12. A process for the manufacture of the transparent composition as defined in claim 1, comprising the step of:
mixing the semi-crystalline polyamide, the amorphous polyamide, the glass filler and the optional components in the appropriate amounts.

13. A process for the manufacture of a transparent article comprising the steps of:
mixing said semi-crystalline polyamide with said amorphous polyamide and said glass filler and optional components to obtain a transparent composition according to claim 1;
processing the transparent composition; and
recovering the transparent article.

14. A transparent article made of the composition according to claim 1.

15. The article according to claim 14, wherein the article is included in electric or electronic equipment; optical equipment, sports equipment; precision instruments; space equipment; aeronautical or motor vehicle equipment; displays; screens; thermal, solar or photovoltaic panels; construction articles; decorative articles; games; toys; fashion articles; furniture; packaging or luggage.

* * * * *